United States Patent

Suzuki

[11] Patent Number: 5,111,734
[45] Date of Patent: May 12, 1992

[54] BOOSTER

[75] Inventor: Haruo Suzuki, Saitama, Japan

[73] Assignee: Jidosha Kiki Co., Ltd., Tokyo, Japan

[21] Appl. No.: 669,101

[22] Filed: Mar. 13, 1991

[30] Foreign Application Priority Data

Apr. 5, 1990 [JP] Japan .................................. 2-90932
Apr. 12, 1990 [JP] Japan .................................. 2-97267

[51] Int. Cl.⁵ .............................................. F15B 9/10
[52] U.S. Cl. .................................. 91/376 R; 91/533; 92/48; 92/128
[58] Field of Search ............... 91/376 R, 369.1, 369.2, 91/369.3, 369.4, 533

[56] References Cited

U.S. PATENT DOCUMENTS

| | | | |
|---|---|---|---|
| 4,512,237 | 4/1985 | Endoh et al. | 91/369.2 |
| 4,619,185 | 10/1986 | Mori et al. | 91/376 R X |
| 4,658,704 | 4/1987 | Mori et al. | 91/369.1 |
| 4,718,328 | 1/1988 | Mori et al. | 91/376 R |
| 4,787,292 | 11/1988 | Tsuyuki et al. | 91/369.3 |
| 4,813,337 | 3/1989 | Endo | 91/376 R X |
| 4,882,980 | 11/1989 | Arino et al. | 91/369.2 X |

Primary Examiner—Edward K. Look
Assistant Examiner—Todd Mattingly
Attorney, Agent, or Firm—Flynn, Thiel, Boutell & Tanis

[57] ABSTRACT

An improvement of a variable pressure passage which is formed in a valve body of a booster, for example, a brake booster, is disclosed. The valve body which is disposed within a shell of the booster comprises a first and a second tubular member which are connected together. An axial space is defined by the outer peripheral surface of the first tubular member and the inner peripheral surface of the second tubular member when they are integrally connected together, and forms a variable pressure passage providing a communication between forwardly and rearwardly located, variable pressure chambers. This avoids the formation of an axial bore and a radial opening which are formed in a solid portion of a single member valve body, as occurs in the prior art, thus allowing the mechanical strength of the valve body to be improved.

14 Claims, 5 Drawing Sheets

BOOSTER

FIELD OF THE INVENTION

The invention relates to a booster, and more particularly, to an improvement of a variable pressure passage formed in a valve body of a brake booster, for example.

DESCRIPTION OF THE PRIOR ART

A booster is known in the art comprising a center plate which divides the interior of a shell into a forwardly located front chamber and a rearwardly located rear chamber, a valve body slidably fitted into the center plate in a hermetically sealed manner, a front power piston mounted on the valve body and disposed within the front chamber, a rear power piston mounted on the valve body and disposed within the rear chamber, a front diaphragm extending across the front power piston and the shell to divide the interior of the front chamber into a forwardly located, constant pressure chamber and a rearwardly located, variable pressure chamber, a rear diaphragm extending across the rear power piston and the shell for dividing the interior of the rear chamber into a forwardly located, constant pressure chamber and a rearwardly located, variable pressure chamber, a constant pressure passage providing a communication between the constant pressure chambers of the front and the rear chamber, and a variable pressure passage providing a communication between the variable pressure chambers of the front and the rear chamber.

In the prior art practice, the variable pressure passage comprises a bore extending axially of the valve body and a radial opening which continues from the axial bore. The opposite ends of the bore which represent the opposite ends of the variable pressure passage open into the peripheral surface of the valve body and its stepped end face. Such construction of the variable pressure passage defined by the axial bore and the radial opening formed in the valve body resulted in a disadvantage that the mechanical strength of the valve body becomes degraded.

SUMMARY OF THE INVENTION

In view of the foregoing, the invention provides an improvement of the described booster. Specifically, in accordance with the invention, the valve body comprises a first tubular member which connects the front power piston and the front diaphragm together, and a second tubular member mounted around the outer periphery of the first tubular member and slidably extending through the center plate while maintaining a hermetic seal with respect thereto and which connects the rear power piston and the rear diaphragm together. An axially extending space defined by the outer surface of the first tubular member and the inner surface of the second tubular member forms the variable pressure passage mentioned above.

With this construction, the variable pressure passage may be formed as an axially extending space defined by the outer surface of the first tubular member and the inner surface of the second tubular member, without requiring an axial bore and a radial opening which are formed in the solid portion of the valve body as occurs in the prior art. In this manner, the mechanical strength of the valve body may be improved over the prior art.

Above and other objects, features and advantages of the invention will become apparent from the following description of several embodiments thereof with reference to the attached drawings.

DETAILED DESCRIPTION OF EMBODIMENTS

Figure 1:
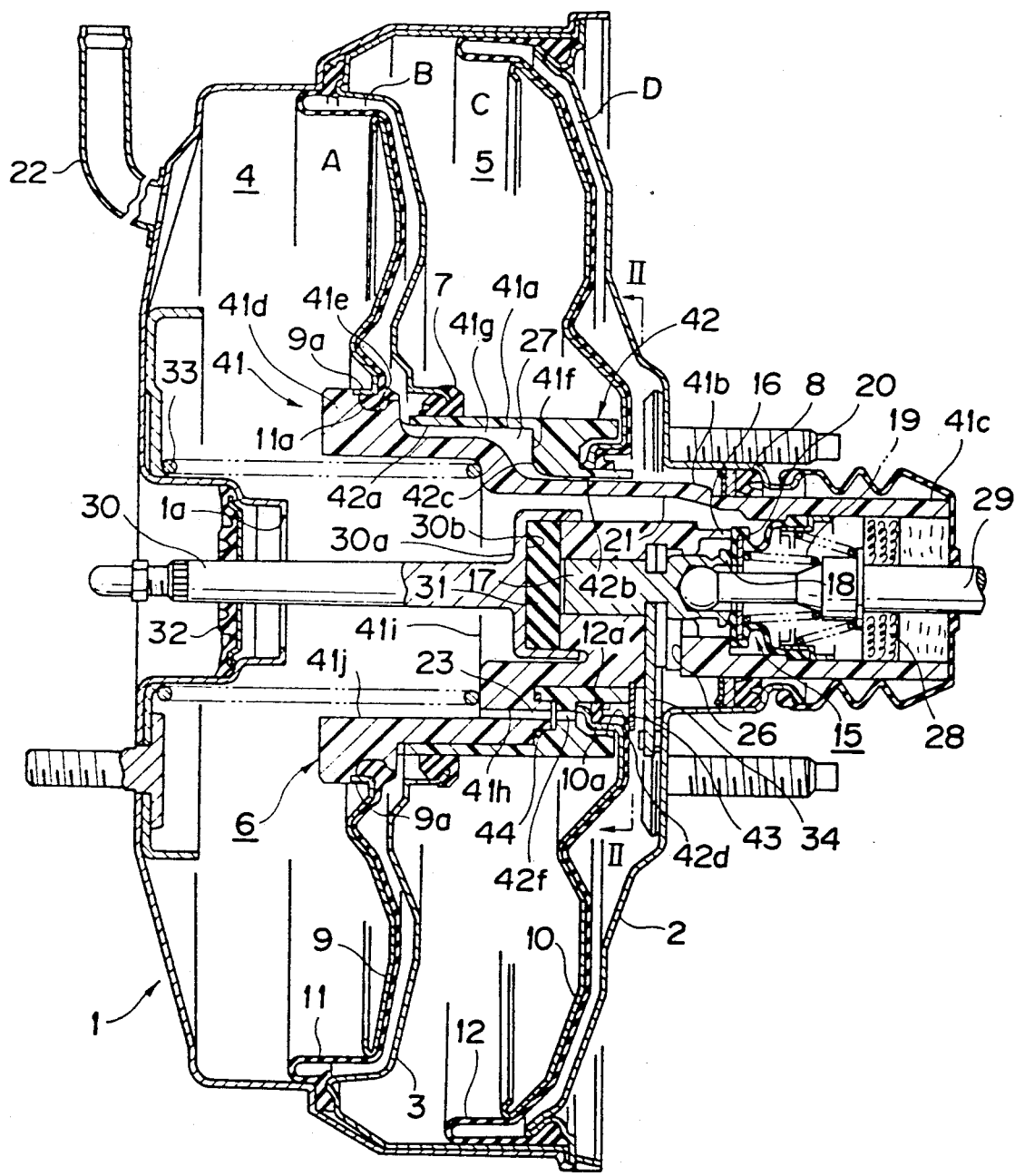
FIG. 1 is a side elevation, mainly in longitudinal section, of one embodiment of the invention.

Referring to the drawings, several embodiments of the invention will now be described. In FIG. 1, an enclosed vessel is defined by a front shell 1 and a rear shell 2, and a center plate 3 is disposed centrally therein to divide the interior of the vessel into a pair of a front and a rear chamber 4, 5 which are disposed on the opposite sides thereof. A substantially tubular valve body 6 slidably extends through axial portions of the rear shell 2 and the center plate 3 while maintaining a hermetic seal by means of annular seal members 7 and 8 which are associated with the center plate 3 and the rear shell 2, respectively.

Connected to the valve body 6 are a front power piston 9 and a rear power piston 10 which are disposed within the front and the rear chamber 4, 5, respectively. A front and a rear diaphragm 11, 12 are applied to the back surfaces of the respective power pistons 9, 10, thus defining a constant pressure chamber A and a variable pressure chamber B across the front diaphragm 11 and also defining a constant pressure chamber C and a variable pressure chamber D across the rear diaphragm 10.

A valve mechanism 15 which switches a fluid circuit between the pair of constant pressure chambers A, C and the pair of variable pressure chambers B, D is disposed within the valve body 6. Specifically, the valve mechanism 15 comprises an annular, first valve seat 16 formed on the valve body 6, an annular, second valve seat 18 formed on the right end of a valve plunger 17, which is slidably disposed within the valve body 6, at a location radially inward of the first valve seat 16, and a valve element 20 which is urged by a spring 19 to be seated upon either valve seat 16 or 18 from the right, as viewed in FIG. 1.

A space located radially outward of an annular seat defined by a contact between the first valve seat 16 and the valve element 20 communicates with the constant pressure chamber A through an axially extending, constant pressure passage 21 formed in the valve body 6, and the chamber A in turn communicates with an intake manifold, not shown, through a tubing 22 mounted on the front shell 1 for introducing a negative pressure. The chamber A also communicates with the constant pressure chamber C through a second, axially extending, constant pressure passage 23 also formed in the valve body 6.

On the other hand, a space located radially inward of the annular seat defined by the contact between the first valve seat 16 and the valve element 20 and located radially outward of another annular seat defined by a contact between the second valve seat 18 and the valve element 20, or a space located intermediate the both annular seats, communicates with the variable pressure chamber D through a radially extending, variable pressure passage 26 formed in the valve body 6, and the chamber D in turn communicates with the variable pressure chamber B through another variable pressure passage 27 also formed in the valve body 6.

Finally, a space located radially inward of the inner annular seat defined by the contact between the second valve seat 18 and the valve element 20 communicates with the atmosphere through a filter 28.

The valve plunger 17 which is slidably disposed within the valve body 6 has its right end connected to an input shaft 29 which is coupled to a brake pedal, not shown, while its left end is disposed in opposing relationship with the right end face of a reaction disc 31 received in a recess 30b formed in one end 30a of a push rod 30. The left end of the push rod 30 projects externally of the front shell 1, slidably extending through an opening 1a formed in the axial portion of the shell and through a seal member 32 for connection with the piston of a master cylinder, not shown. The valve body 6 is normally urged to the rear side by a return spring 33, and normally assumes its inoperative position shown where the valve plunger 17 and a key member 34 engaged with the valve body 6 abut against the internal wall surface of the rear shell 2.

The described arrangement remains essentially the same as a known brake booster of tandem type. However, in the present embodiment, the valve body 6 comprises a first tubular member 41 which is disposed nearer the longitudinal center line and having its rear portion extending through an opening formed in the rear shell 2 to the outside thereof, and a second tubular member 42 fitted around a portion of the first tubular member 41 which is located within the shell.

The valve mechanism 15 and the end 30a of the push rod 30 are housed inside the first tubular member 41, and the constant pressure passage 21 and the variable pressure passage 26 are formed in the first tubular member 41, which is also engaged by the key member 34.

The outer periphery of the first tubular member 41 is in the form of a series of stepped cylinders having successively decreasing diameters, thus including a large diameter portion 41a, an intermediate diameter portion 41b and a small diameter portion 41c as viewed from the front side toward the rear side sequentially. In addition, the forward end of the large diameter portion 41a is formed with a flange 41d which bulges radially outward.

In the present embodiment, toward its rear side, the peripheral surface of the flange 41d on the first tubular member 41 is formed with an annular groove, defining an engaging portion, 41e in which an inner peripheral edge 9a of the front power piston 9 and a bead 11a extending around the inner periphery of the front diaphragm 11 are fitted in overlying relationship, the inner edge 9a and the bead 11a being fitted, under pressure into the annular groove from the rear side for purpose of connection.

On the other hand, the second tubular member 42 is formed with a stepped through-opening having an increased diameter toward its front end so as to match the large diameter portion 41a and the intermediate diameter portion 41b of the first tubular member 41 in shape and size. After the inner peripheral edge 9a of the front power piston 9 and the bead 11a around the front diaphragm 11 are connected with the flange 41d and the first tubular member 41, a large diameter portion 42a of the second tubular member 42 is fitted over the large diameter portion 41a of the first tubular member 41 from the rear side while a small diameter portion 42b of the second tubular member 42 is fitted over the intermediate diameter portion 41b of the first tubular member 41 from the rear side. When the second tubular member 42 is fitted over the first tubular member 41, a stepped end face 42c of the second tubular member 42 will abut against a stepped end face 41f of the first tubular member 41, thus positioning the second tubular member 42, fitted over the first tubular member 41, in the axial direction.

The large diameter portion 42a of the second tubular member 42 has a depth (or axial dimension) which is chosen to be slightly less than the axial size of the large diameter portion 41a of the first tubular member 41 so that when the second tubular member 42 is fitted over the first tubular member 41 and positioned in the manner mentioned above, a given clearance is formed between the rear end face of the flange 41d on the first tubular member 41 and a forward end face of the second tubular member 42.

The rear end face of the second tubular member 42 thus positioned is formed with an annular groove 42d having a given depth and width and in which an inner peripheral edge of the rear power piston 10, forming a stepped cylinder 10a, is fitted. A bead 12a extending around the inner periphery of the rear diaphragm 12 is fitted into an annular space defined by the inner peripheral surface of the stepped cylinder 10a and the inner peripheral surface of the annular groove 42d, thus connecting the rear power piston 10 and the rear diaphragm 12 to the second tubular member 42 (or valve body 6).

It is to be noted that given clearances are formed between the outer peripheral surface of the stepped cylinder 10a of the rear power piston 10 connected to the annular groove 42d in the second tubular member 42 and the outer peripheral surface of the annular groove 42d, and between the rear end face of the second tubular member 42 and the rear power piston 10 which is disposed in opposing relationship thereto.

A substantially U-shaped key member 43 (see FIG. 2) which is mounted on the intermediate diameter portion 41b of the first tubular member 41 is engaged with the rear end face of the second tubular member 42 toward its axis and is retained in such position, thus preventing the second tubular member 42 from being withdrawn from the first tubular member 41.

When the second tubular member 42 is locked to the first tubular member 41 by the key member 43, the resilience of the key member 43 is utilized to urge the outer peripheral portion of the key member 43 forwardly to abut against the rear diaphragm 12. This prevents the stepped cylinder 10a of the rear power piston 10 and the bead 12a around the rear diaphragm 12 from being withdrawn from the annular groove 42d formed in the second tubular member 42.

An axial groove 41g is formed, at a given location, along the peripheral surface of the large diameter portion 41a and the intermediate diameter portion 41b of the first tubular member 41, starting from a point adjacent to the rear end face of the flange 41d and extending rearwardly. In the present embodiment, the axial groove 41g thus formed in the first tubular member 41 and the inner peripheral surface of the through-opening in the second tubular member 42 in their connected condition define an axially extending space which forms the variable pressure passage 27 for providing a communication between the both variable pressure chambers B and D.

The first tubular member 41 is formed with an axially extending, through-opening 41h angularly displaced by 180° from the location of the axial groove 41g. The forward end of the through-opening 41h opens into a stepped end face 41i adjacent to the inner periphery against which the rear end of a return spring 33 abuts while the rear end of the through-opening 41h opens into the stepped end face 41f in the large diameter portion 41a. The second tubular member 42 is formed with an axially extending, through-opening 42f which extends from the stepped end face 42c to the annular groove 42d, in alignment with the location of the through-opening 41h formed in the first tubular member 41. A space which is defined by the through-openings 41h and 42f formed in the both members as well as the outer peripheral surface of the annular groove 42d formed in the second tubular member 42 and the outer peripheral surface of the stepped cylinder 10a of the rear power piston 10 forms the constant pressure passage 23 which provides a communication between the both constant pressure chambers A and C.

In the present embodiment, in order to connect the through-openings 41h and 42f in the both members together, the rear opening of the through-opening 41h in the first tubular member 41 is provided with a rearwardly projecting, cylindrical extension while the stepped end face which forms the opening of the through-opening 42f formed in the second tubular member 42 is formed with a recess in alignment with the cylindrical extension, so that the engagement between the extension and the recess is effective to achieve an alignment of the variable pressure passage 27 and the constant pressure passage 23 which are formed by the members 41 and 42.

To seal the engaging extension and recess of the constant pressure passage 23, a rubber seal member 44 is attached to the inner peripheral surface of the recess formed in the second tubular member 42.

As described, rather than providing the variable pressure passage 27 defined by an axial bore and a radial opening which are formed in the solid portion of the valve body 6 as occurs in the prior art, in the present embodiment, the valve body 6 itself comprises the first and the second tubular member 41 and 42, and the variable pressure passage 27 is formed by the axial groove in the outer peripheral surface of the first tubular member 41 and the inner peripheral surface of the second tubular member 42. Thus, by removing the axial bore and the radial opening which were formed in the solid portion of the valve body 6, the mechanical strength of the valve body 6 can be improved.

In addition, as mentioned above, since the variable pressure passage 27 is formed by the inner peripheral surface of the stepped opening in the second tubular member 42, and the axial groove 41g formed in the outer periphery of the large diameter portion 41a and the intermediate diameter portion 41b of the first tubular member 41, the rear end opening of the variable pressure passage 27 will be located radially inward of the forward end opening thereof. As a consequence, the stepped cylinder 10a of the rear power piston 10 which is connected to a point radially outward of the rear end opening of the variable pressure passage 27 can be connected to the valve body 6 (namely, the second tubular member 42) at a point which is shifted more radially inward as compared with the prior art, allowing the external diameter of the second tubular member 42 (or valve body 6) to be reduced.

Considering this more specifically, in a brake booster of tandem type of the prior art where the opening 1a in the front shell 1 through which the push rod 30 extends is enlarged, and through which the rear end of a master cylinder, not shown, is extended to be received within the front shell 1 in order to reduce the overall axial size of the brake booster, the rear end of the master cylinder will be received as surrounded by the return spring 33. In this instance, it is necessary that a large diameter opening 41j formed in the first tubular member 41 which is located forwardly of the stepped end face 41i against which the rear end of the return spring 33 abuts must have an increased internal diameter, thus requiring an increase in the external diameter of the valve body 6. In such brake booster in which the rear end of the master cylinder extends through the opening 1a in the front shell 1 to be received within the front shell 1, an axial passage is formed in the solid portion of the valve body 6 which is located radially outward of the large diameter opening 41j in order to form the variable pressure passage 27 in the valve body 6. Because of the requirement imposed by a drawing die, such axial passage must be shaped as rectilinear when viewed in the axial direction of the valve body 6. If such passage is formed as displaced radially inward and outward as in the embodiment shown, the formation of the axial passage will require the use of a pair of parallel extending, drawing dies which define the axial passage as well as a radially extending, drawing die which provides a communication between the both portions. In addition, an opening formed in the outer periphery of the valve body which is formed by the radially extending, drawing die must be closed by a closure member, thus resulting in a complicated manufacturing process. As a consequence, the stepped cylinder 10a of the rear power piston 10 which is to be connected to the valve body 6 will have to be connected at a point which is located radially outward of the location of the rear end opening of the rectilinear variable pressure passage 27 formed in the valve body 6. Accordingly, there results a disadvantage that the external diameter of the valve body 6 has to be increased in order to achieve its connection with the stepped cylinder 10a, by an amount which is required to allow the stepped cylinder 10a of the rear power piston 10 to be connected at a point radially outward of the rear end opening of the variable pressure passage 27.

By contrast, in the present embodiment, the rear end opening of the variable pressure passage 27 is located radially inward of the forward opening thereof, so that the stepped cylinder 10a of the rear power piston 10 to be connected to the second tubular member 42 which assumes a position located radially outward of the rear end opening of the variable pressure passage 27 may be connected at a point which is more radially inwardly displaced as compared with the prior art, with consequence that the external diameter of the second tubular member 42 (or valve body 6) to which the stepped cylinder 10a is connected may be reduced as compared with the prior art, thus contributing to a reduction in the overall weight of the booster.

In addition, in the present embodiment, the constant pressure passage 23 in the valve body 6 is formed by the axial through-openings 41h and 42f formed in the tubular members 41 and 42 as well as the annular groove 42d formed in the end face of the second tubular member 42, so that there is no opening in the outer peripheral surface of the valve body 6 which serves as the rear end of the constant pressure passage 23. It will be appreciated that as the brake booster is operated, a forward drive is transmitted to the valve body 6 through the both power pistons 9 and 10, but as a result of the absence of such opening, a concentration of internal stresses which are produced in the valve body 6 to the area of the openings at the opposite ends of the constant pressure passage 23 is avoided, thus allowing an improvement in the mechanical strength of the valve body 6 as compared with the prior art where the opposite ends of the constant pressure passage 23 opened into the outer peripheral surface of the valve body 6.

In the embodiment described above, the variable pressure passage 27 is formed by the axial groove 41g in the outer peripheral surface of the first tubular member 41 and the inner peripheral surface of the second tubular member 42, but it may also be formed by a combination of a groove formed in the inner peripheral surface of the second tubular member 42 and the outer peripheral surface of the first tubular member 41.

The invention has been described above as applied to a brake booster in the described embodiment, but it should be understood that the invention is equally applicable to a clutch booster.

Additionally, while the constant pressure passage 23 is formed in the valve body 6 in the described embodiment, it may also be formed in the outer peripheral portion of the shell 1 in a manner known in the art.

Figure 3:
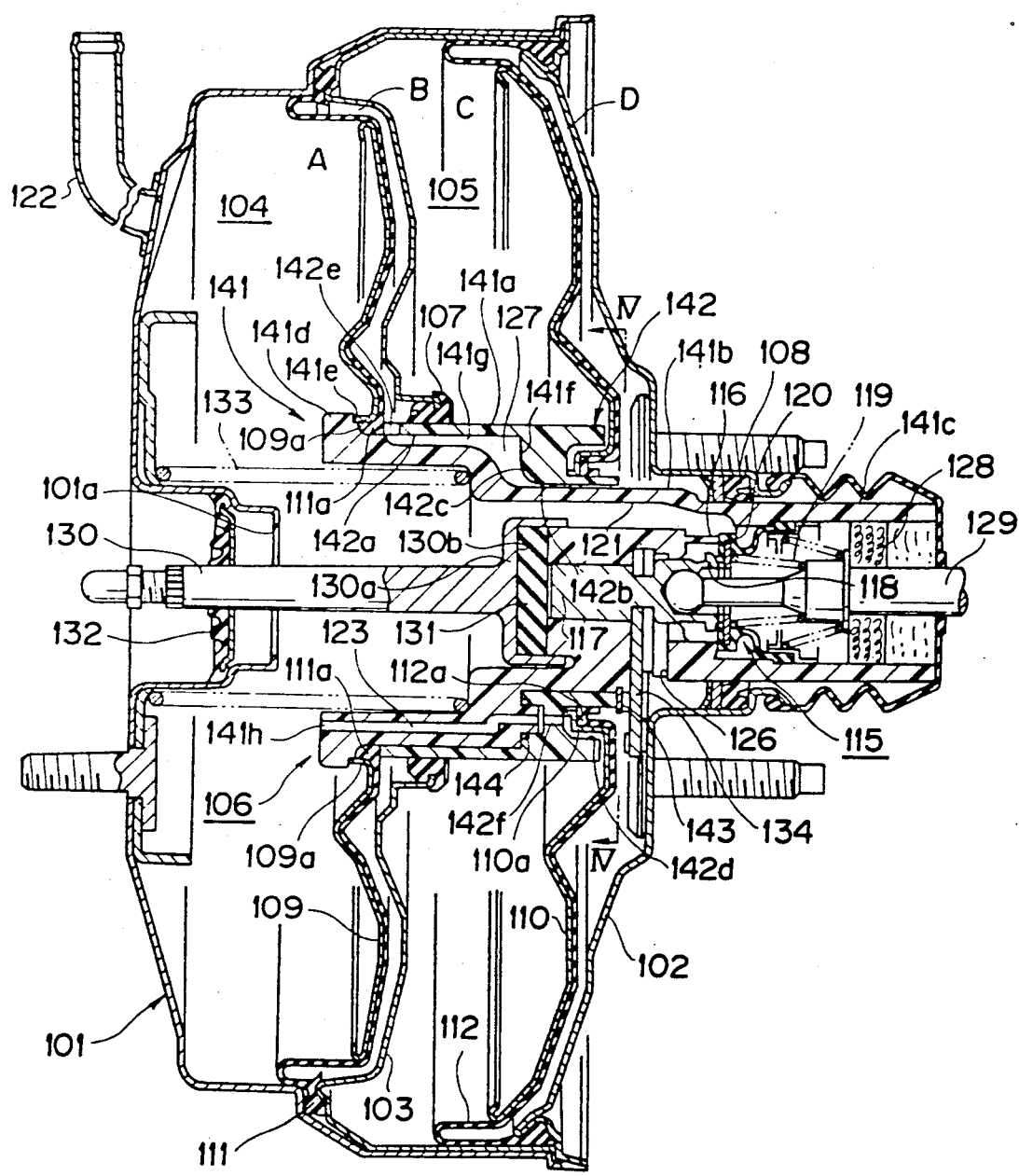
FIG. 3 is a similar view to FIG. 1 showing another embodiment of the invention.
Figure 4:
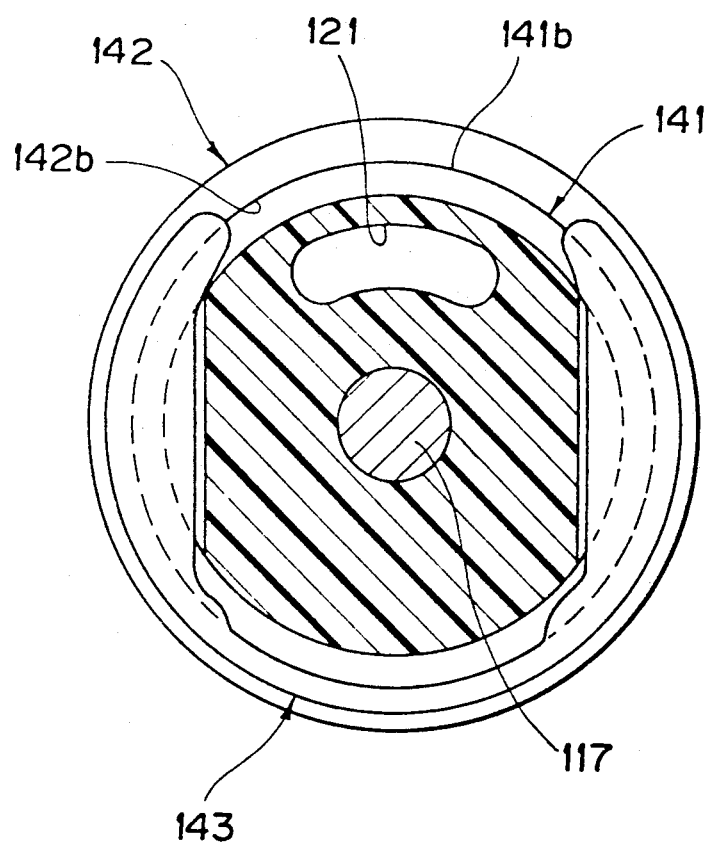
FIG. 4 is a cross section of part taken along the line IV—IV shown in FIG. 3.

Referring to FIGS. 3 and 4 which illustrate a second embodiment of the invention, a first tubular member 141 and a second tubular member 142, which constitute together a valve body 106, are connected together by allowing a bead 111a extending around the inner periphery of a front diaphragm 111 to be held sandwiched between an end face of a flange 141d on the first tubular member 141 and the forward end of the second tubular member 142.

Specifically, a rear end face of the flange 141d of the first tubular member 141 is formed with an engaging portion 141e extending to its peripheral surface and in which an inner peripheral edge 109a of a front power piston 109 is fitted from the rear side. In this manner, an annular space is defined by the peripheral edge 109a of the front power piston 109, the rear end face of the flange 141d on the first tubular member 141 and the outer peripheral surface of a large diameter portion 141a, and the bead 111a extending around the inner periphery of the front diaphragm 111 which is fitted over the large diameter portion 141a is fitted into the annular space. Under this condition, the bead 111a is held in compression, from the rear side, by the front end of the second tubular member 142 which is fitted over the large diameter portion 141a of the first tubular member 141.

As before, the second tubular member 142 is axially positioned by the abutment of its stepped end face 142c against a stepped end face 141f of the first tubular member 141, and when so positioned, the second tubular member 142 is prevented from being withdrawn from over the first tubular member 141 by a key member 143, generally in the similar manner as shown in FIG. 1.

The forward end of the second tubular member 142 bears against the bead 111a, and accordingly in the second embodiment, the forward end of the second tubular member 142 is formed with a notch 142e in alignment with the axial groove 141g in the first tubular member 141. A variable pressure passage 127 is formed by the notch 142e, the axial groove 141g in the first tubular member 141 and the inner peripheral surface of the second tubular member 142.

Figure 2:
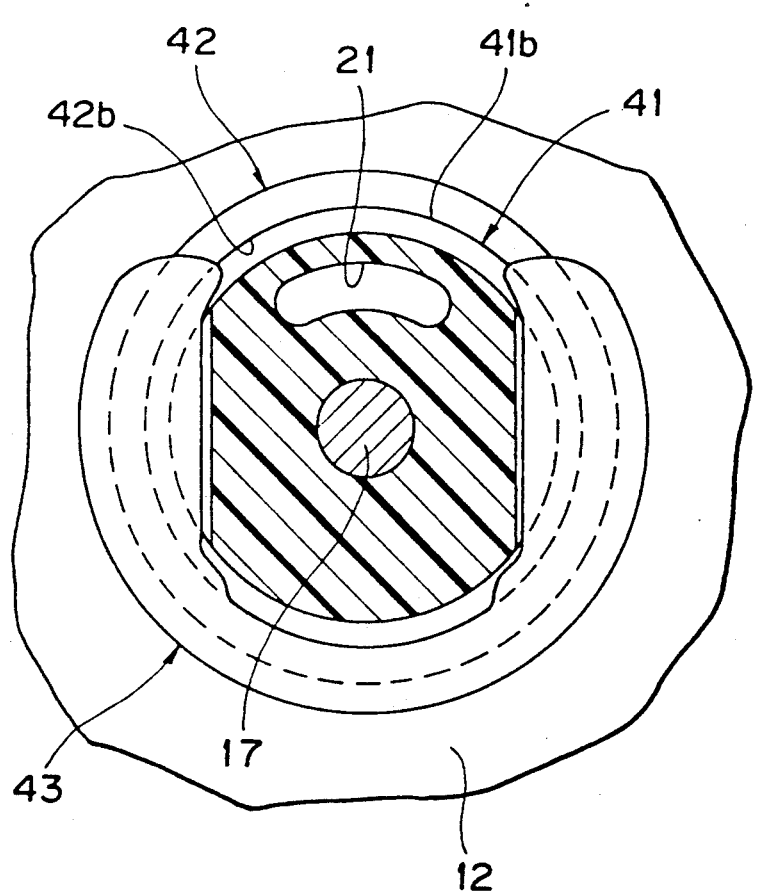
FIG. 2 is a cross section of part taken along the line II—II shown in FIG. 1.

As shown in FIG. 4, the key member 143 used in the second embodiment has a reduced radial width as compared with the key member 43 shown in FIG. 2. Accordingly, as illustrated in FIG. 3, the key member 143 of the second embodiment does not abut against the inner periphery of the rear diaphragm 112, merely abutting against the rear end face of the second tubular member 142.

In addition, in the second embodiment, the front end of an axial opening 141h in the first tubular member 141 opens into the front end face of the first tubular member 141, so that the axial opening 141h has an increased axial length than the axial opening 41h shown in FIG. 1.

The above covers differences of the second embodiment with respect to the first embodiment, and in other respects, the arrangement of the second embodiment is similar to that of the first embodiment. Accordingly, parts used in the second embodiment which correspond to similar parts used in the first embodiment are designated by like reference numerals or characters used in the first embodiment, to which 100 is added.

As described, since the variable pressure passage 127 is formed by the pair of tubular members 141 and 142 which are connected together integrally, the mechanical strength of the valve body 106 can be improved in the second embodiment.

Finally, in the second embodiment, the bead 111a extending around the inner periphery of the front diaphragm 111 can be connected to the valve body 106, by merely fitting the bead 111a over the large diameter portion 141a of the first tubular member 141. Accordingly, the connection of the bead 111a with the valve body 106 is simplified as compared with the prior art, and the wall thickness of the bead 111a may be reduced and its axial size reduced without causing a twisting of the bead to assure a reliable sealing function. By contrast, in the prior art arrangement, a corresponding bead 111a has been a press fit into an outer peripheral portion of a valve body which comprises a single member, and accordingly, the bead 111a is subject to twisting, which must be prevented by increasing the wall thickness thereof, resulting in an increased axial size of the bead.

Figure 5:
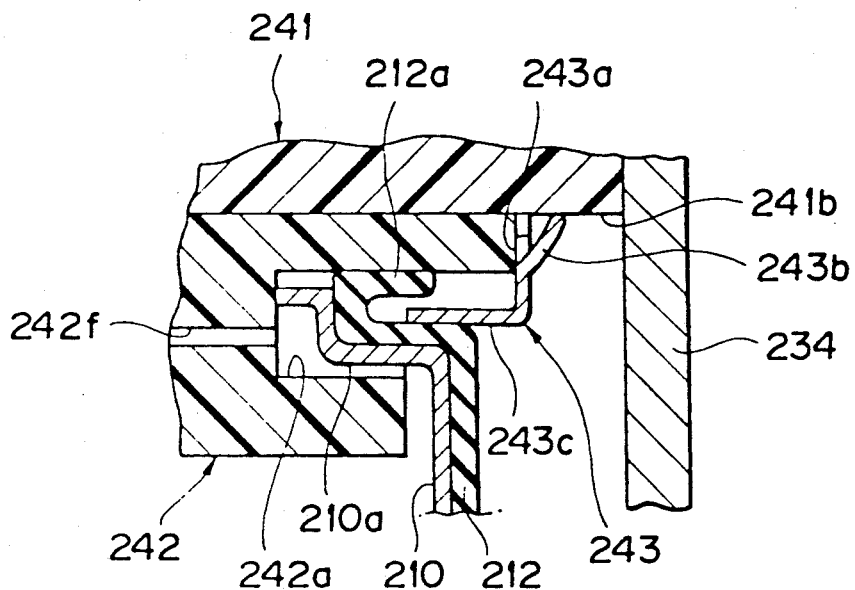
FIG. 5 is a cross section illustrating a modification of part shown in FIG. 3.
Figure 6:
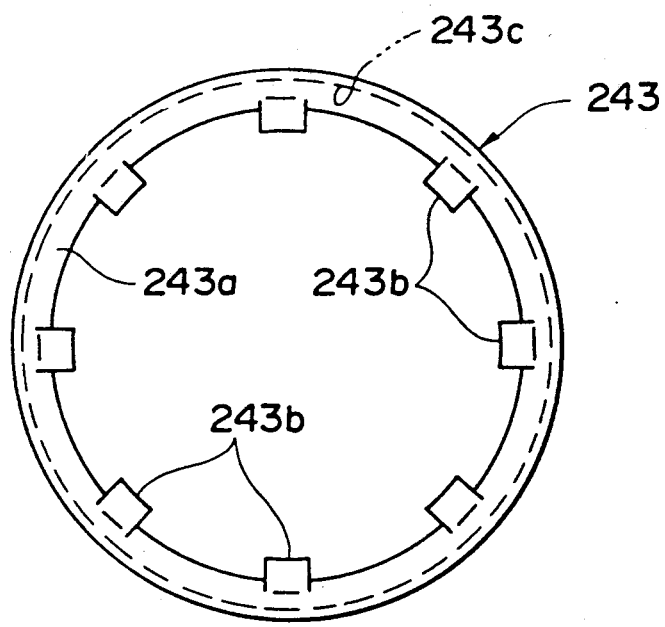
FIG. 6 is a right-hand side elevation of a member shown in FIG. 5.

FIGS. 5 and 6 show a modification which may be used to lock the second tubular member 142 to the first tubular member 141. In this modification, a second tubular member 242 is locked to a first tubular member 241 by a ring-shaped retainer 243 rather than by the key member 143.

When locking the second tubular member 242 to the first tubular member 241 by means of the retainer 243, the retainer 243 is initially fitted over an intermediate diameter portion 241b of the first tubular member 241 and then its radial end face 243a is brought into abutment against the rear end face of the second tubular member 242. Under this condition, a plurality of engaging claws 243b which are formed to extend rearwardly from the retainer 243 adjacent to its inner periphery may be brought into abutment against the outer peripheral surface of the intermediate diameter portion 241b of the first tubular member 241, thus locking the second tubular member 242 to the first tubular member 241.

The retainer 243 has an outer peripheral portion 243c, which extends forwardly to form a cylindrical configuration. The outer peripheral portion 243c may be fitted into a portion of a rear diaphragm 212 having a reduced wall thickness and which is disposed adjacent to a bead 212a extending around its inner periphery.

Accordingly, the rear diaphragm 212 will be held sandwiched between the outer peripheral portion 243c of the retainer 243 and a stepped cylinder 210a of a rear power piston 210, thus contributing to strengthening the connection between the second tubular member 242 and the bead 212a of the rear diaphragm 212. In addition, the withdrawal of the bead 212a from an annular groove 242d formed in the second tubular member 242 is prevented.

It is to be noted that in the modification shown in FIGS. 5 and 6, parts corresponding to those used in FIGS. 3 and 4 are designated by like reference numerals or characters used therein, to which 10 is added.

While the invention has been described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A booster including a center plate which divides the interior of a shell into a forwardly located, front chamber and a rearwardly located, rear chamber, a valve body slidably extending through the center plate while maintaining a hermetic seal therewith, a front power piston mounted on the valve body and disposed within the front chamber, a rear power piston mounted on the valve body and disposed within the rear chamber, a front diaphragm applied across the front power piston and the shell for dividing the interior of the front chamber into a forwardly located, constant pressure chamber and a rearwardly located, variable pressure chamber, a rear diaphragm applied across the rear power piston and the shell for dividing the interior of the rear chamber into a forwardly located, constant pressure chamber and a rearwardly located, variable pressure chamber, a constant pressure passage for providing a communication between the constant pressure chambers in the front and the rear chamber, and a variable pressure passage for providing a communication between the variable pressure chambers in the front and the rear chamber;

characterized in that the valve body comprises a first tubular member having the front power piston and the front diaphragm connected therein, and a second tubular member disposed in surrounding relationship with the first tubular member, slidably extending through the center plate while maintaining a hermetic seal therewith nd having the rear power piston and the rear diaphragm connected thereto, the variable pressure passage being formed by an axial space defined between the outer peripheral surface of the first tubular member and the inner peripheral surface of the surrounding second tubular member, and wherein, in all slidable positions of said valve body, said peripheral surfaces of said tubular members both extend from behind said rear power piston forwardly beyond said center plate into said front chamber.

2. A booster according to claim 1 in which the first tubular member is formed with a flange around its outer periphery toward its forward end, the second tubular member being fitted over the first tubular member so as to surround a portion of the first tubular member located rearward of the flange, the second tubular member having a rear end face in which an annular groove is formed, to which an inner peripheral edge of the rear power piston and a bead extending around the inner periphery of the rear diaphragm are connected.

3. A booster according to claim 2 in which an inner peripheral portion of the front diaphragm and the front power piston are connected to the flange of the first tubular member.

4. A booster according to claim 1, wherein, said outer peripheral surface of said first tubular member extends further forwardly than said inner peripheral surface of said second tubular member to define therebetween an outwardly directed opening of said variable pressure passage, said opening being located forwardly of said center plate and rearwardly of said front power piston and opening directly into the frontmost variable pressure chamber so that pressurized fluid flowing in said variable pressure passage is confined directly between said tubular members until the fluid reaches said opening and passes into the frontmost variable pressure chamber.

5. A booster according to claim 4, wherein said variable pressure passage as defined between said tubular members extends generally axially through said valve body, at least one of said peripheral surfaces of said tubular members having a generally axially facing and radially extending step portion which divides said variable pressure passage into front and rear passage portions which are radially offset from each other by a distance approximately equal to the radial extent of said step portion.

6. A booster according to claim 5, wherien said tubular members include respective sidewall portions which are opposed to one another and extend from said rear chamber forwardly beyond said center plate into said front chamber, said variable pressure passage being located between said sidewall portions, said sidewall portion of said first tubular member including a radially thickened front part and a rear part which is substantially thinner radially than said front part thereof, said sidewall portion of said second tubular member includings a radially thickened rear part and a front part which is substantially thinner radially than said front part thereof, said sidewall portion of said second tubular member including a radially thickened rear part and a front part which is substantially thinner radially than said rear part thereof, said rear parts of said first and second tubular members being disposed in axially overlapping relationship relative to each other in said rear chamber, and said front part of said second tubular member extending forwardly beyond said center plate and terminating at a location in said front chamber rearwardly adjacent said radially thickened front part of said first tubular member.

7. A booster according to claim 6, wherein said front power piston includes an inner peripheral edge portion which is secured to said radially thickened front part of said first tubular member, and wherein said rear power piston includes an inner peripheral edge portion which is secured to said radially thickened rear part of said second tubular member, said inner peripheral edge portion of said rear power piston being disposed radially inwardly of said inner peripheral edge portion of said front power piston.

8. A booster according to claim 1, wherein said variable pressure passage is defined in its entirety between said peripheral surfaces of said tubular members.

9. A booster including a center plate which divides the interior of a shell into a forwardly located, front chamber and a rearwardly located, rear chamber, a valve body slidably extending through the center plate while maintaining a hermetic seal therewith, a front power piston mounted on the valve body and disposed within the front chamber, a rear power piston mounted on the valve body and disposed within the rear chamber, a front diaphragm applied across the front power piston and the shell for dividing the interior of the front chamber into a forwardly located, constant pressure chamber and a rearwardly located, variable pressure chamber, a rear diaphragm applied across the rear power piston and the shell for dividing the interior of the rear chamber into a forwardly located, constant pressure chamber and a rearwardly located, variable pressure chamber, a constant pressure passage for providing a communication between the constant pressure chambers in the front and the rear chamber, and a variable pressure passage for providing a communication between the variable pressure chambers in the front and the rear chamber;

characterized in that the valve body comprises a first tubular member having the front power piston and the front diaphragm connected thereto, and a second tubular member disposed in surrounding relationship with the first tubular member, slidably extending through the center plate while maintaining a hermetic seal therewith and having the rear power piston and the rear diaphragm connected thereto, the variable pressure passage being formed by an axial space defined between the outer peripheral surface of the first tubular member and the inner peripheral surface of the surrounding second tubular member, the first tubular member being formed with a flange around its outer periphery toward its forward end, the second tubular member being fitted over the first tubular member so as to surround a portion of the first tubular member located rearward of the flange, wherein said flange projects outwardly of the first tubular member such that said outer peripheral surface of said first tubular member has a stepped configuration, and wherein a bead extending around the inner periphery of the front diaphragm and the second tubular member are sequentially fitted, from the rear side, around the periphery of the first tubular member, the bead extending around the inner periphery of the front diaphragm being held, under axial compression, between the flange of the first tubular member and the second tubular member while the second tubular member is secured to the first tubular member by securing means.

10. A brake booster according to claim 9, wherein the second tubular member has a rar end face in which an annular groove is formed, to which an inner peripheral edge of the rear power piston and a bead extending around the inner periphery of the rear diaphragm are connected.

11. A booster according to claim 9 in which the securing means comprising an annular retainer fitted over the first tubular member.

12. A booster according to claim 10 in which the securing means comprises a substantially U-shaped key member, which is secured to the outer periphery of the first tubular member while it is held in abutment against the rear end face of the second tubular member.

13. A booster including a center plate which divides the interior of a shell into a forwardly located, front chamber and a rearwardly located, rear chamber, a valve body slidably extending through the center plate while maintaining a hermetic seal therewith, a front power piston mounted on the valve body and disposed within the front chamber, a rear power piston mounted on the valve body and disposed within the rear chamber, a front diaphragm applied across the front power piston and the shell for dividing the interior or the front chamber into a forwardly located, constant pressure chamber and a rearwardly located, variable pressure chamber, a rear diaphragm applied across the rear power piston and the shell for dividing the interior of the rear chamber into a forwardly located, constant pressure chamber and a rearwardly located, variable pressure chamber, a constant pressure passage for providing a communication between the constant pressure chambers in the front and the rear chamber, and a variable pressure passage for providing a communication between the variable pressure chambers in the front and the rear chamber;

characterized in the valve body comprises a first tubular member having the front power piston and the front diaphragm connected thereto, and a second tubular member disposed in surrounding relationship with the first tubular member, slidably extending through the center plate while maintaining a hermetic seal therewith and having the rear power piston and the rear diaphragm connected thereto, the variable pressure passage being formed by an axial space defined by the outer peripheral surface of the firs tubular member and the inner peripheral surface of the second tubular member, the first tubular member is formed with a flange around its outer periphery toward its forward end, he second tubular member being fitted over the first tubular member so as to surround a portion of the first tubular member located rearward of the flange, the second tubular member having a rear end face in which an annular groove is formed, to which an inner peripheral edge of the rear power piston and a bead extending around the inner periphery of the rear diaphragm are connected, said flange projecting outwardly of the first tubular member such that said outer peripheral surface of said first tubular member has a stepped configuration, a bead extending around the inner periphery of the front diaphragm and the second tubular member are sequentially fitted, from the rear side, around the periphery of the first tubular member, the bead extending around the inner periphery of the front diaphragm being held, under axial compression, between the flange of the first tubular member and the second tubular member while the second tubular member is secured to the first tubular member by securing means which comprises an annular retainer fitted over the first tubular member, the retainer has an outer peripheral portion which is formed as a cylinder extending forwardly, an inner peripheral portion of the rear diaphragm being held sandwiched between the outer peripheral portion of the retainer and the inner periphery of the rear power piston.

14. A booster including a center plate which divides the interior of a shell into a forwardly located front chamber and a rearwardly located rear chamber, a valve body slidably extending through the center plate while maintaining a hermetic seal there with, a front power piston mounted on the valve body and disposed within the front chamber, a rear power piston mounted on the valve body and disposed within the rear chamber, a front diaphragm applied across the front power piston and the shell for dividing the interior of the front chamber into a forwardly located constant pressure chamber and a rearwardly located variable pressure chamber, a rear diaphragm applied across the rear power piston and the shell for dividing the interior of the rear chamber into a forwardly located constant pressure chamber and a rearwardly located variable pressure chamber, a constant pressure passage for providing a communication between the constant pressure chambers in the front and the rear chamber, and a variable pressure passage for providing a communication between the variable pressure chambers in the front and the rear chamber;

characterized in that the valve body comprises a first tubular member having the front power piston and the front diaphragm connected thereto, and a second tubular member disposed in surrounding relationship relative to the first tubular member and slidably extending through the center plate while maintaining a hermetic seal therewith, said second tubular member having the rear power piston and the rear diaphragm connected thereto, the variable pressure passage being formed by an axial space defined between the outer peripheral surface of the fist tubular member and the inner peripheral surface of the second tubular member, the second tubular member having a rear end face in which an annular groove is formed, to which an inner peripheral edge of the rear power piston and a bead extending around the inner periphery of the rear diaphragm are connected, the second tubular member is secured to the first tubular member by securing means which comprises an annular retainer fitted over the first tubular member, the retainer has an outer peripheral portion which is formed as a cylinder extending forwardly, an inner peripheral portion of the rear diaphragm being held sandwiched between the outer peripheral portion of the retainer and the inner periphery of the rear power piston.

* * * * *

UNITED STATES PATENT AND TRADEMARK OFFICE
CERTIFICATE OF CORRECTION

PATENT NO. : 5 111 734
DATED : May 12, 1992
INVENTOR(S) : Haruo SUZUKI

It is certified that error appears in the above-identified patent and that said Letters Patent is hereby corrected as shown below:

```
Column 9, line 50; change "therein" to ---thereto---.
Column 9, line 54; change "nd" to ---and---.
Column 10, lines 44-45; change "includings" to
    ---including---.
Column 10, line 46; delete in its entirety.
Column 10, line 47; delete in its entirety.
Column 10, line 48; delete in its entirety.
Column 10, line 49; delete "front part".
Column 11, line 58; change "rar" to ---rear---.
Column 12, line 35; change "firs" to ---first---.
Column 14, line 8; change "fist" to ---first---.
```

Signed and Sealed this

Thirty-first Day of August, 1993

Attest:

BRUCE LEHMAN

Attesting Officer

Commissioner of Patents and Trademarks